(12) United States Patent
Eo et al.

(10) Patent No.: US 9,293,788 B2
(45) Date of Patent: Mar. 22, 2016

(54) ELECTROLYTE FOR RECHARGEABLE LITHIUM BATTERY AND RECHARGEABLE LITHIUM BATTERY INCLUDING SAME

(71) Applicant: SAMSUNG SDI CO., LTD., Yongin-si, Gyeonggi-do (KR)

(72) Inventors: Soo-Mi Eo, Yongin-si (KR); Yong-Beom Lee, Yongin-si (KR); Kwang-Jo Cheong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 295 days.

(21) Appl. No.: 13/802,601

(22) Filed: Mar. 13, 2013

(65) Prior Publication Data

US 2014/0079986 A1 Mar. 20, 2014

(30) Foreign Application Priority Data

Sep. 20, 2012 (KR) .................. 10-2012-0104564

(51) Int. Cl.
*H01M 10/0567* (2010.01)
*H01M 10/052* (2010.01)
*C08F 283/01* (2006.01)

(52) U.S. Cl.
CPC ......... *H01M 10/0567* (2013.01); *C08F 283/01* (2013.01); *H01M 10/052* (2013.01); *H01M 2300/0025* (2013.01); *Y02E 60/122* (2013.01)

(58) Field of Classification Search
USPC ........................................ 429/188
See application file for complete search history.

(56) References Cited

U.S. PATENT DOCUMENTS 5,516,845 A * 5/1996 Heese ...................... C08J 3/226
                                                    522/106
5,597,659 A * 1/1997 Morigaki et al. .............. 429/303

(Continued)

FOREIGN PATENT DOCUMENTS

EP          1715542 A1  * 10/2006
KR  10-2004-0099606 A  * 12/2004
KR     10-0744835 B1   *  7/2007

*Primary Examiner* — Peter D Mulcahy
*Assistant Examiner* — Henry Hu

(74) *Attorney, Agent, or Firm* — Lewis Roca Rothgerber Christie LLP

(57) ABSTRACT

An electrolyte for a rechargeable lithium battery and a rechargeable lithium battery including the same, and the electrolyte includes a lithium salt, a non-aqueous organic solvent, and an additive,
wherein the additive includes
a polyester polyol-based monomer represented by the following Chemical Formula 1;
C1 to C10 alkyl acrylate; and
a phosphate-based compound selected from triallyl phosphate represented by the following Chemical Formula 10, triacryl phosphate represented by the following Chemical Formula 11, or a combination thereof:

[Chemical Formula 1]

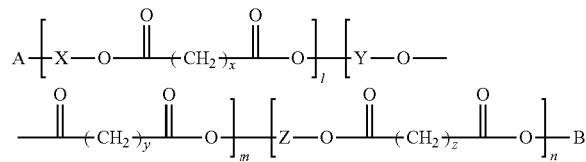

In Chemical Formula 1, each substituent is the same as described in the detailed description.

[Chemical Formula 10]

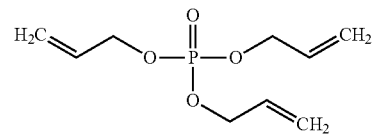

[Chemical Formula 11]

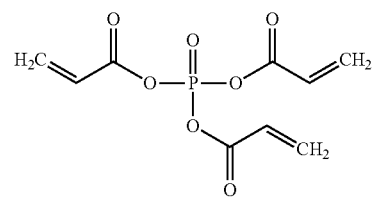

18 Claims, 1 Drawing Sheet

(56) References Cited

U.S. PATENT DOCUMENTS

| | | |
|---|---|---|
| 8,541,119 B2 * | 9/2013 | Kim et al. .................. 429/50 |
| 2010/0003604 A1 * | 1/2010 | Kang et al. ................ 429/314 |
| 2011/0117430 A1 * | 5/2011 | Cheong et al. ............. 429/207 |
| 2011/0117441 A1 * | 5/2011 | Cheong et al. ............. 429/309 |
| 2014/0072880 A1 * | 3/2014 | Cheong et al. ............. 429/303 |

* cited by examiner

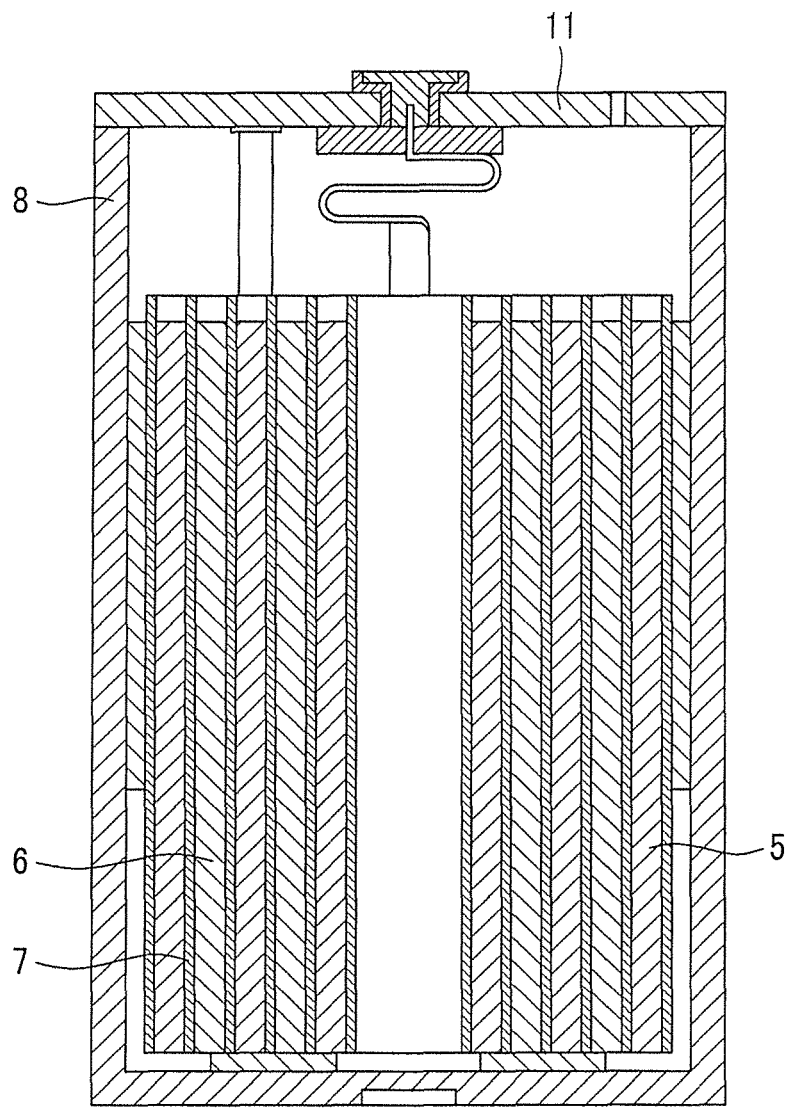

ELECTROLYTE FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2012-0104564, filed in the Korean Intellectual Property Office on Sep. 20, 2012, the entire content of which is incorporated herein by reference.

BACKGROUND

1. Field

This disclosure relates to an electrolyte for a rechargeable lithium battery and a rechargeable lithium battery including the same.

2. Description of the Related Art

Rechargeable lithium batteries have recently drawn attention as a power source for small portable electronic devices. They use an organic electrolyte and thereby have at least twice the discharge voltage of a comparable battery using an alkali aqueous solution, and accordingly have high energy density.

During the initial charge of a rechargeable lithium battery, lithium ions, which are released from the lithium-transition metal oxide of the positive electrode of the battery, are transferred to a carbon negative electrode where the ions are intercalated into the carbon. Because of its high reactivity, lithium reacts with the carbon negative electrode to produce $Li_2CO_3$, LiO, LiOH, etc., and a thin film on the surface of the negative electrode may be formed. This film is referred to as a solid electrolyte interface (SEI) film.

The SEI film formed during the initial charge not only prevents the reaction between lithium ions and the carbon negative electrode or other materials during charging and discharging, but it also acts as an ion tunnel, allowing the passage of lithium ions. The ion tunnel prevents disintegration of the structure of the carbon negative electrode, which is caused by co-intercalation of organic solvents having a high molecular weight along with solvated lithium ions into the carbon negative electrode. This co-intercalation may collapse the carbon negative electrode.

Once the SEI film is formed, lithium ions do not react again with the carbon electrode or other materials, such that the amount of lithium ions is reversibly maintained. That is, carbon of a negative electrode reacts with an electrolyte at initial charge to form a passivation layer such as a SEI film on a surface of the negative electrode. Thereby, decomposition of an electrolyte may be prevented and a stable charge and discharge may be maintained.

In this way, a rechargeable lithium battery does not undergo an irreversible formation reaction of a passivation layer after an initial charge reaction and maintains a stable cycle-life. However, gases are generated due to decomposition of a carbonate-based organic solvent during the organic SEI film-forming reaction. These gases include $H_2$, CO, $CO_2$, $CH_4$, $C_2H_6$, $C_3H_8$, $C_3H_6$, etc. depending on the type of non-aqueous organic solvent and negative active material used. Due to the gases generated inside the battery, the battery may become swollen in a thickness direction when it is charged.

When the battery is fully charged and kept at a high temperature, the organic SEI film gradually decomposes based on the electrochemical energy and thermal energy that increases as time passes, continuously causing a side-reaction with a new adjacent surface of the negative electrode with exposed electrolyte. The continuous generation of gases increases the internal pressure inside the battery. Such an increase of internal pressure causes distortion of the battery in a certain plane.

SUMMARY

An aspect of an embodiment of the present invention is directed toward an electrolyte for a rechargeable lithium battery having high cycle-life characteristics at room temperature and a high temperature and high rate cycle-life characteristics.

An aspect of an embodiment of the present invention is directed toward a rechargeable lithium battery including the electrolyte for a rechargeable lithium battery.

According to one embodiment of the present invention, provided is an electrolyte for a rechargeable lithium battery that includes a lithium salt, a non-aqueous organic solvent, and an additive, wherein the additive includes a phosphate-based compound selected from a polyester polyol-based monomer represented by the following Chemical Formula 1; C1 to C10 alkyl acrylate; and triallyl phosphate represented by the following Chemical Formula 10, triacryl phosphate represented by the following Chemical Formula 11, or a combination thereof.

[Chemical Formula 1]

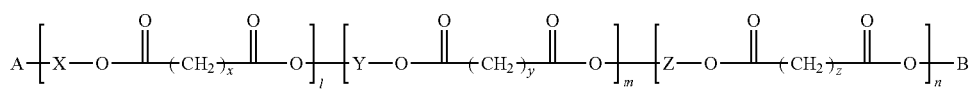

In Chemical Formula 1,

A and B are each independently one of substituents represented by the following Chemical Formulae 2 to 9, X, Y, and Z are each independently a residual group derived from an alcohol derivative, x, y, and z are each independently an integer of 1 to 20, and l, m, and n are each independently an integer of 1 to 35.

  [Chemical Formula 2]

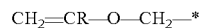  [Chemical Formula 3]

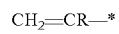  [Chemical Formula 4]

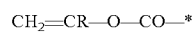  [Chemical Formula 5]

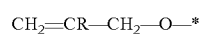  [Chemical Formula 6]

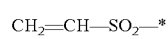  [Chemical Formula 7]

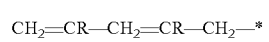  [Chemical Formula 8]

  [Chemical Formula 9]

In Chemical Formulae 2 to 9, R is independently hydrogen, a C1 to C20 alkyl group, a C2 to C20 alkenyl group, a C2 to C20 alkynyl group, a C3 to C20 cycloalkyl group, a C3 to C20 cycloalkenyl group, a C3 to C20 cycloalkynyl group, or a C6 to C20 aryl group.

[Chemical Formula 10]

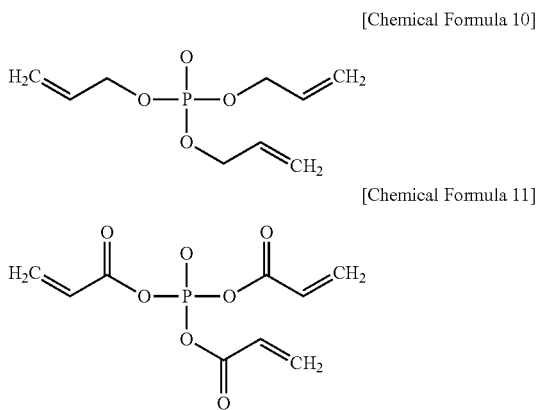

[Chemical Formula 11]

The alcohol derivative in Chemical Formula 1 may include ethyleneglycol, polyethyleneglycol, propyleneglycol, polypropyleneglycol, diethyleneglycol, alkanediol, ethoxylated alkanediol, propoxylated alkanediol, trimethylolpropane, ethoxylated trimethylolpropane, propoxylated trimethylolpropane, ditrimethylolpropane, ethoxylated ditrimethylolpropane, propoxylated ditrimethylolpropane, pentaerythritol, ethoxylated pentaerythritol, propoxylated pentaerythritol, dipentaerythritol, ethoxylated dipentaerythritol, propoxylated dipentaerythritol, bisphenol A, ethoxylated bisphenol A, or propoxylated bisphenol A.

The polyester polyol-based monomer may have a weight average molecular weight of about 16,000 to about 20,000, and a number average molecular weight of about 6,000 to about 8,000.

The alkyl acrylate may include C4 to C8 alkyl acrylate.

The additive may include about 20 wt % to about 80 wt % of the polyester polyol-based monomer; about 10 wt % to about 60 wt % of the alkyl acrylate; and about 1 wt % to about 40 wt % of the phosphate-based compound.

The additive may include the polyester polyol-based monomer, the alkyl acrylate, and the phosphate-based compound in a weight ratio of about 75:15:10 to about 60:20:20.

The additive may be included in an amount of about 1 part to about 10 parts by weight based on 100 parts by weight of the non-aqueous organic solvent.

According to another embodiment of the present invention, a rechargeable lithium battery including a positive electrode; a negative electrode; and the electrolyte is provided.

Hereinafter, further embodiments of this disclosure will be described in more detail.

In one embodiment, a rechargeable lithium battery having excellent cycle-life characteristics at room temperature and a high temperature and high rate cycle-life characteristics may be realized.

BRIEF DESCRIPTION OF THE DRAWING

The drawing is a schematic view showing a rechargeable lithium battery according to one embodiment.

DETAILED DESCRIPTION

An exemplary embodiment of this disclosure will hereinafter be described in detail. However, the embodiment is only exemplary, and this disclosure is not limited thereto.

According to one embodiment of the present invention, an electrolyte for a rechargeable lithium battery is a polymer electrolyte including a lithium salt, a non-aqueous organic solvent, and an additive.

When the polymer electrolyte prepared by adding an additive (described below in more detail) when the lithium salt is dissolved in the non-aqueous organic solvent is used to fabricate a rechargeable lithium battery, the electrolyte may improve high temperature stability and high rate cycle-life characteristics as well as cycle-life characteristics of the rechargeable lithium battery when respectively allowed to stand at room temperature and a high temperature.

The additive may include a polyester polyol-based monomer, an alkyl acrylate, and a phosphate-based compound.

The polyester polyol-based monomer is represented by a compound represented by the following Chemical Formula 1.

[Chemical Formula 1]

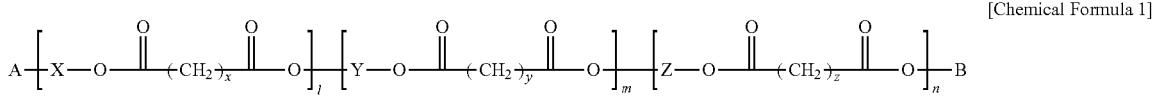

In Chemical Formula 1,

A and B are each independently one of substituents represented by the following Chemical Formulae 2 to 9, X, Y, and Z are each independently a residual group derived from an alcohol derivative, x, y, and z are each independently an integer of 1 to 20, and l, m, and n are each independently an integer of 1 to 35.

| | |
|---|---|
| $CH_2=CR-CO-*$ | [Chemical Formula 2] |
| $CH_2=CR-O-CH_2-*$ | [Chemical Formula 3] |
| $CH_2=CR-*$ | [Chemical Formula 4] |
| $CH_2=CR-O-CO-*$ | [Chemical Formula 5] |
| $CH_2=CR-CH_2-O-*$ | [Chemical Formula 6] |
| $CH_2=CH-SO_2-*$ | [Chemical Formula 7] |
| $CH_2=CR-CH_2=CR-CH_2-*$ | [Chemical Formula 8] |
| $CH_2=CR-CO-O-(CH_2)_2-NH-CO-*$ | [Chemical Formula 9] |

In Chemical Formulae 2 to 9, R is independently hydrogen, a C1 to C20 alkyl group, a C2 to C20 alkenyl group, a C2 to C20 alkynyl group, a C3 to C20 cycloalkyl group, a C3 to C20 cycloalkenyl group, a C3 to C20 cycloalkynyl group, or a C6 to C20 aryl group.

The A and B substituents in the above Chemical Formula 1 may be one selected from the above Chemical Formula 2 to 9 and specifically, one selected from the above Chemical Formula 2, 4, 7, and 9.

In Chemical Formula 1, X, Y, and Z are residual groups derived from an alcohol derivative used for preparation of polyesterpolyol, respectively. Examples of the alcohol derivative may include ethyleneglycol, polyethyleneglycol, propyleneglycol, polypropyleneglycol, diethyleneglycol, alkanediol, ethoxylated alkanediol(ethoxylated alkanediol), propoxylated alkanediol(propoxylated alkanediol), trimethylolpropane, ethoxylated trimethylolpropane, propoxylated trimethylolpropane, ditrimethylolpropane, ethoxylated ditrimethylolpropane, propoxylated ditrimethylolpropane, pentaerythritol, ethoxylated pentaerythritol, propoxylated pentaerythritol, dipentaerythritol, ethoxylated dipentaerythritol, propoxylated dipentaerythritol, bisphenol A, ethoxylated bisphenol A, propoxylated bisphenol A, and the like.

The polyester polyol-based monomer represented by the above Chemical Formula 1 may have a weight average molecular weight of about 16,000 to about 20,000, and a number average molecular weight of about 6,000 to about 8,000. When the polyester polyol-based monomer has a weight average molecular weight and a number average molecular weight within the ranges, a rechargeable lithium battery including the polymer electrolyte may be stable at a high temperature and be durable against an external physical impact.

The polyester polyol-based monomer may be included in an amount of about 20 wt % to about 80 wt %, specifically about 50 wt % to about 80 wt %, and more specifically about 50 wt % to about 80 wt % based on the total amount of the additive. When the polyester polyol-based monomer is included within the range, a rechargeable lithium battery including the polymer electrolyte may have excellent anti-leaking and high temperature stability and well endure against an external physical impact.

The alkyl acrylate may be a C1 to C10 alkyl acrylate, specifically a C4 to C8 alkyl acrylate, and more specifically C6 hexyl acrylate.

The electrolyte according to one embodiment includes both the polyester polyol-based monomer and the alkyl acrylate and thus, may increase capacity and battery strength of a rechargeable lithium battery more than an electrolyte including only the polyester polyol-based monomer.

The alkyl acrylate may be included in an amount of about 10 wt % to about 60 wt %, specifically 10 wt % to about 40 wt %, and more specifically about 10 wt % to about 25 wt % based on the total amount of the additive. When the alkyl acrylate is included within the range, the alkyl acrylate reacts with the polyester polyol-based monomer and may realize a rechargeable lithium battery having excellent strength, capacity, and cycle-life characteristic.

The phosphate-based compound may include triallyl phosphate represented by the following Chemical Formula 10, triacryl phosphate represented by the following Chemical Formula 11, or a combination thereof.

[Chemical Formula 10]

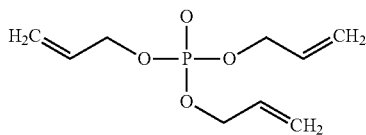

[Chemical Formula 11]

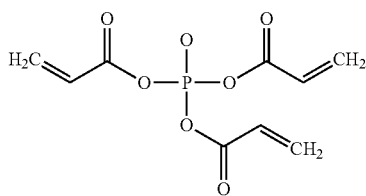

The phosphate-based compound has three allyl groups as shown in the above Chemical Formula 10 or three acrylate groups as shown in the above Chemical Formula 11 and thus, may increase cross-linking density of a polymer matrix when the polyester polyol-based monomer is polymerized with the alkyl acrylate. In addition, the phosphate-based compound has a phosphate structure having excellent thermal stability and a trifunctional allyl or acrylate group and thus, improving high temperature stability of a polymer produced through polymerization of the phosphate-based compound, the polyester polyol-based monomer, and the alkyl acrylate and decrease viscosity of the polymer. Accordingly, the polymer electrolyte may improve high temperature stability and high rate cycle-life characteristics of a rechargeable lithium battery. In addition, the phosphate-based compound is oxidized and decomposed before a carbonate-based organic solvent during the initial charge and forms a film on the surface of a positive electrode and thus, may suppress thickness expansion of a battery when stored at a high temperature after the full-charge and thus, improving reliability.

The phosphate-based compound may be included in an amount of about 1 wt % to about 40 wt %, specifically about 5 wt % to about 25 wt %, and more specifically about 10 wt % to about 25 wt % based on the total amount of the additive. When the phosphate-based compound is included within the range, the phosphate-based compound may improve reliability without causing a side-reaction.

More specifically, the additive may include the polyester polyol-based monomer, the alkyl acrylate and the phosphate-based compound in a weight ratio of about 75:15:10 to about 60:20:20.

The additive may be included in an amount of about 1 part to about 10 parts by weight, and more specifically about 5 parts to about 10 parts by weight based on 100 parts by weight of the non-aqueous organic solvent. When the additive is included within the range, the additive may improve thermal stability of a polymer prepared by polymerizing the phosphate-based compound, the polyester polyol-based monomer, and the alkyl acrylate and increase cross-linking density of its matrix and thus, improving high temperature and high rate cycle-life characteristics of a rechargeable lithium battery.

The lithium salt dissolved in a non-aqueous organic solvent supplies lithium ions in the battery, and performs a basic operation of a rechargeable lithium battery and improves lithium ion transport between positive and negative electrodes.

The lithium salt includes $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiCl, LiI, $LiB(C_2O_4)_2$ (lithium bis(oxalato) borate, LiBOB), or a combination thereof.

The lithium salt may be used in a concentration of about 0.1M to about 2.0M. When the lithium salt is included at the above concentration range, electrolyte performance and lithium ion mobility may be enhanced due to desired electrolyte conductivity and viscosity.

The non-aqueous organic solvent acts as a medium for transmitting ions taking part in the electrochemical reaction of the battery. The non-aqueous organic solvent may include a carbonate-based, ester-based, ether-based, ketone-based, alcohol-based, or aprotic solvent, but is not limited thereto.

The carbonate-based solvent may include, for example, a linear carbonate compound such as dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), and the like; a cyclic carbonate compound such as ethylene carbonate (EC), propylene carbonate (PC), or butylene carbonate (BC), but is not limited thereto.

When the linear carbonate compounds and cyclic carbonate compounds are mixed, an organic solvent having high dielectric constant and low viscosity can be provided. The cyclic carbonate and the linear carbonate are mixed together in a volume ratio ranging from about 1:1 to about 1:9.

The ester-based solvent may include n-methylacetate, n-ethylacetate, n-propylacetate, dimethylacetate, methylpropionate, ethylpropionate, γ-butyrolactone, decanolide, valerolactone, mevalonolactone, caprolactone, or the like, but is not limited thereto. The ether-based solvent may include dibutyl ether, tetraglyme, diglyme, dimethoxyethane, 2-methyltetrahydrofuran, tetrahydrofuran, and the like, but is not limited thereto. The ketone-based solvent may include cyclohexanone, or the like, but is not limited thereto. The alcohol-based solvent may include ethyl alcohol, isopropyl alcohol, or the like, but is not limited thereto.

The non-aqueous organic solvent may be used singularly or in a mixture. When the organic solvent is used in a mixture, the mixture ratio may be controlled in accordance with a desirable battery performance.

A polymer electrolyte according to one embodiment may further include an additive selected from vinylene carbonate, a halogen-substituted carbonate-based compound, nitroethylene carbonate, cyanoethylene carbonate, and the like, in order to improve cycle-life of a rechargeable lithium battery.

The halogen-substituted carbonate-based compound may include fluoroethylene carbonate, difluoroethylene carbonate, chloroethylene carbonate, dichloroethylene carbonate, bromoethylene carbonate, dibromoethylene carbonate, and the like.

The use amount of the additive may be adjusted within an appropriate range in order to improve cycle-life.

A polymer electrolyte according to one embodiment may be a gel polymer electrolyte which refers to a chemical gel polymer electrolyte obtained by polymerization within a battery. The polymer electrolyte may be prepared by mixing the polyester polyol-based monomer, the alkyl acrylate, the phosphate-based compound, a polymerization initiator, the non-aqueous organic solvent, and the lithium salt to prepare a electrolyte precursor solution, fabricating a battery using the solution, and allowing the battery to stand at a temperature at which polymerization starts for a predetermined number of hours.

The polymerization initiator may be any material being capable of initiating a polymerization reaction easily and not deteriorating battery performance, and may include one or more selected from an organic peroxide or an azo-based compound.

The organic peroxide may include peroxydicarbonates such as di(4-t-butylcyclohexyl)peroxydicarbonate, di-2-ethylhexyl peroxydicarbonate, di-isopropyl peroxydicarbonate, di-3-methoxybutyl peroxydicarbonate, t-butyl peroxyisopropylcarbonate, t-butyl peroxy-2-ethylhexylcarbonate, 1,6-bis(t-butyl peroxycarbonyloxy)hexane, diethylene glycol-bis(t-butyl peroxycarbonate), and the like; diacyl peroxide such as diacetyl peroxide, dibenzoyl peroxide, dilauroyl peroxide, bis-3,5,5-trimethyl hexanoyl peroxide, and the like; peroxy esters such as perhexyl pivalate, t-butyl peroxypivalate, t-amyl peroxypivalate, t-butyl peroxy-2-ethyl-hexanoate, t-hexylperoxy pivalate, t-butylperoxy neodecanoate, t-butylperoxy neoheptanoate, t-hexylperoxy pivalate, 1,1,3,3-tetramethylbutylperoxy neodicarbonate, 1,1,3,3-tetramethylbutyl 2-ethylhexanoate, t-amylperoxy 2-ethylhexanoate, t-butylperoxy isobutyrate, t-amylperoxy 3,5,5-trimethyl hexanoate, t-butylperoxy 3,5,5-trimethyl hexanoate, t-butylperoxy acetate, t-butylperoxy benzoate, di-butylperoxy trimethyl adipate, and the like.

The azo-based compound may include 2,2'-azo-bis(isobutyronitrile), 2,2'-azo-bis(2,4-dimethylvaleronitrile) or 1,1'-azo-bis(cyanocyclo-hexane).

In the polymerization reaction, the polymerization initiator may be included in an amount enough to cause polymerization reaction of monomers and in general, in an amount ranging from about 50 ppm to about 1,000 ppm, specifically about 200 ppm to about 400 ppm based on the total weight (referred to as a weight of a pre-gel) of the polyester polyol-based monomer, alkyl acrylate, phosphate-based compound, non-aqueous organic solvent, and lithium salt. When the polymerization initiator is included within the range, it may not remain in a polymer electrolyte as a byproduct and may not cause a side reaction that generates a gas (ex: $CO_2$ gas caused by a peroxide-based compound and/or $N_2$ gas caused by an azo-based compound) and may be all used to prepare a polymer electrolyte having an appropriate polymerization degree.

Hereinafter, a rechargeable lithium battery according to one embodiment is illustrated by referring to the drawing.

The drawing is a schematic view showing the lithium rechargeable battery according to one embodiment.

Referring to FIG. 1, the rechargeable lithium battery according to one embodiment is a prismatic battery that includes an electrode assembly 4 including a positive electrode 5, a negative electrode 6, and a separator 7 interposed between the positive electrode 5 and negative electrode 6 in a battery case 8, an electrolyte injected through an upper part of the battery case 8, and a cap plate 11 sealing the battery case 8. The rechargeable lithium battery according to one embodiment is not limited by a prismatic battery and may be any battery that includes the electrolyte for a rechargeable lithium battery and is operable as a battery. For example, it may be a cylindrical, coin-type, or pouch battery.

The electrolyte is the same as described above.

The positive electrode includes a current collector and a positive active material layer disposed on the current collector. The positive active material layer includes a positive active material, a binder, and optionally a conductive material.

The current collector may be Al (aluminum), but is not limited thereto.

The positive active material includes lithiated intercalation compounds that reversibly intercalate and deintercalate lithium ions. The positive active material may include a composite oxide including at least one selected from cobalt, manganese, and nickel, as well as lithium. In particular, the following lithium-containing compounds may be used:

$Li_aA_{1-b}B_bD_2$ ($0.90 \leq a \leq 1.8$ and $0 \leq b \leq 0.5$); $Li_aE_{1-b}B_bO_{2-c}D_c$ ($0.90 \leq a \leq 1.8$, $0 \leq b \leq 0.5$, $0 \leq c \leq 0.05$); $LiE_{2-b}B_bO_{4-c}D_c$ ($0 \leq b \leq 0.5$, $0 \leq c \leq 0.05$); $Li_aNi_{1-b-c}Co_bB_cD_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bB_cO_{2-\alpha}F_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bB_cO_{2-\alpha}F_2$ ($0.90 \leq a \leq 1.8$, $0 \leq b \leq 0.5$, $0 \leq c \leq 0.05$, $0 < \alpha < 2$); $Li_aNi_{1-b-c}Mn_bB_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bB_cO_{2-\alpha}F_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bB_cO_{2-\alpha}F_2$ (wherein, in the above chemical formula, $0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dGeO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMnG_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulae, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F (here F refers to the symbol in the above chemical formulae) is F (here F refers to Fluorine), S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The compound may have a coating layer on the surface or be mixed with a compound having a coating layer. The coating layer may include at least one coating element compound selected from the group consisting of an oxide of the coating element, a hydroxide of the coating element, an oxyhydroxide of the coating element, an oxycarbonate of the coating element, and a hydroxylcarbonate of the coating element. The compounds for the coating layer can be amorphous or crystalline. The coating element for a coating layer may include Mg, Al, Co, K, Na, Ca, Si, Ti, V, Sn, Ge, Ga, B, As, Zr, or a mixture thereof. The coating layer can be formed in a method having no negative influence on properties of a positive active material by including these elements in the compound. For example, the method may include any suitable coating method such as spray coating, dipping, and the like but is not illustrated in more detail, because it is well-known to those who work in the related field.

The binder improves binding properties of the positive active material particles to one another and to a current collector. Examples of the binder may include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, polyamideimide, polyacrylic acid, and the like, but are not limited thereto.

The conductive material is used in order to improve conductivity of an electrode. Any electrically conductive material may be used as a conductive material unless it causes a chemical change. Examples of the conductive material include one or more kinds of natural graphite, artificial graphite, carbon black, acetylene black, ketjen black, a carbon fiber, a metal powder or metal fiber (including copper, nickel, aluminum, silver, etc.), and a polyphenylene derivative.

The negative electrode includes a negative current collector and a negative active material layer disposed on the negative current collector.

The negative current collector may be a copper foil.

The negative active material layer may include a negative active material, a binder, and optionally a conductive material.

The negative active material may include a material that reversibly intercalates/deintercalates lithium ions, lithium metal, a lithium metal alloy, a material being capable of doping/dedoping lithium, transition metal oxide, or a combination thereof.

The material that reversibly intercalates/deintercalates lithium ions may be a carbon material. The carbon material may be any generally-used carbon-based negative active material in a lithium ion rechargeable battery. Examples of the carbon material include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon, a hard carbon, a mesophase pitch carbonized product, fired coke, and the like.

The lithium metal alloy may include lithium and a metal selected from Na, K, Rb, Cs, Fr, Be, Mg, Ca, Sr, Si, Sb, Pb, In, Zn, Ba, Ra, Ge, Al, and Sn.

Examples of the material being capable of doping/dedoping lithium include a Si-based compound (such as Si, $SiO_x$ ($0<x<2$), a Si—C composite, a Si—Y alloy (wherein Y is an alkali metal, an alkaline-earth metal, Group 13 to 16 elements, a transition element, a rare earth element, or a combination thereof, and not Si), a Si—C composite, or a combination thereof); a Sn-based compound (such as Sn, $SnO_2$, a Sn—C composite, a Sn—Y alloy (wherein Y is an alkali metal, an alkaline-earth metal, Group 13 to 16 elements, a transition element, a rare earth element, or a combination thereof, and not Sn), or a combination thereof); or a combination thereof. At least one of these materials may be mixed with $SiO_2$. The element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The transition metal oxide may include vanadium oxide, lithium vanadium oxide, and the like.

The binder improves binding properties of negative active material particles with one another and with a current collector. The binder includes a non-water-soluble binder, a water-soluble binder, or a combination thereof. The non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof. The water-soluble binder includes a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof. When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkali metal salts thereof. The alkali metal may be Na, K, or Li. The cellulose-based compound may be included in an amount of about 0.1 to about 3 parts by weight based on 100 parts by weight of the negative active material.

The conductive material is included to improve electrode conductivity. Any electrically conductive material may be used as a conductive material unless it causes a chemical change. Examples of the conductive material include a carbon-based material (such as natural graphite, artificial graphite, carbon black, acetylene black, ketjen black, a carbon fiber, or the like); a metal-based material of metal powder or metal fiber (including copper, nickel, aluminum, silver, or the like); a conductive polymer such as polyphenylene derivatives; or a mixture thereof.

The negative electrode and positive electrode may be fabricated in a method of mixing the active material, a conductive material, and a binder to prepare an active material composition and coating the composition on a current collector, respectively.

The electrode fabrication method is well known and thus, is not described in detail in the present specification. The solvent includes N-methylpyrrolidone and the like, but is not limited thereto.

The separator may include any suitable materials commonly used in the conventional lithium battery as long as it is separating (or insulating) a negative electrode from a positive electrode and providing a transporting passage for lithium ion. In other words, the separator may have a low resistance to ion transportation and an excellent impregnation for an electrolyte. For example, it may be selected from glass fiber, polyester, TEFLON (tetrafluoroethylene), polyethylene, polypropylene, polytetrafluoroethylene (PTFE), or a combination thereof. It may have a form of a non-woven fabric or a woven fabric. For example, a polyolefin-based polymer separator such as polyethylene, polypropylene or the like is mainly used for a lithium ion battery. In order to ensure the heat resistance or mechanical strength, a coated separator including a ceramic component or a polymer material may be used. Selectively, it may have a mono-layered or multi-layered structure.

The following examples illustrate the present invention in more detail. These examples, however, should not in any sense be interpreted as limiting the scope of the present invention.

A person having ordinary skill in this art can sufficiently understand parts of the present invention that are not specifically described.

EXAMPLE 1

Pre-gel was prepared by mixing (1) 7 wt % of an additive prepared by mixing a polyester polyol-based monomer (a weight average molecular weight of 18,000) represented by the following Chemical Formula 12, hexyl acrylate, and triallyl phosphate represented by the following Chemical Formula 10 in a weight ratio of 69:25:6 with (2) 93 wt % of a mixed solution prepared by mixing ethylene carbonate (EC), ethylmethyl carbonate (EMC), and diethyl carbonate (DEC) in a volume ratio of 3:2:5 to prepare a non-aqueous organic solvent and dissolving 1.3M of $LiPF_6$ therein.

[Chemical Formula 12]

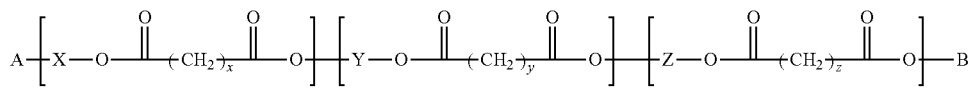

In Chemical Formula 12,
A and B are substituents represented by Chemical Formula 13, respectively,
X is a residual group derived from ethyleneglycol, Y is a residual group derived from diethyleneglycol, and Z is a residual group derived from trimethylolpropane, and
x, y, and z are each 4.

[Chemical Formula 13]

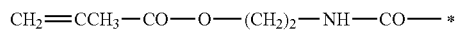

[Chemical Formula 10]

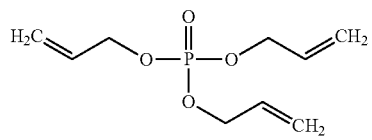

Then, 350 ppm of a 2,2'-azobis(isobutyronitrile) azo-based polymerization initiator was added to the pre-gel based on the weight of the pre-gel and dissolved therein, thereby preparing a polymer electrolyte composition.

2.7 g of the polymer electrolyte composition was inserted in an assembly fabricated using positive and negative electrodes and a separator and aged for 16 hours. The resulting product was sealed under vacuum and heated in a 70° C. oven for 2 hours 30 minutes, thereby fabricating a laminate-type rechargeable lithium battery cell. The heating brought about a polymerization reaction and prepared a polymer electrolyte in the rechargeable lithium battery cell.

The positive electrode was fabricated by mixing a $LiCoO_2$ positive active material, an acetylene black conductive material, and a polyvinylidene fluoride binder in a weight ratio of 96:2:2 in an N-methylpyrrolidone solvent to prepare positive active material slurry, coating the slurry on an Al foil current collector, and pressing it using a suitable method. Herein, the positive electrode was adjusted regarding active mass density to have battery capacity of 3.15 $mAh/cm^2$ per unit area of the positive electrode.

The negative electrode was fabricated by mixing natural graphite, a styrene-butadiene rubber binder, and a carboxylmethyl cellulose thickener in water as a solvent to prepare negative active material slurry, coating the slurry on a Cu foil current collector, and pressing it using a suitable method. The natural graphite and the styrene-butadiene rubber binder were mixed in a weight ratio of 97:3, and the carboxylmethyl cellulose thickener was used in an amount of 1 part by weight based on 100 parts by weight of the styrene-butadiene rubber binder.

The rechargeable lithium battery cell had capacity of 3.15 $mAh/cm^2$ per unit area of the positive electrode and 1C nominal capacity (capacity guaranteed during capacity evaluation experiment) of 940 mAh.

EXAMPLE 2

A rechargeable lithium battery cell was fabricated according to the same method as Example 1 except for using triacryl phosphate represented by the following Chemical Formula 11 instead of the triallyl phosphate represented by the above Chemical Formula 10 among the additives.

[Chemical Formula 11]

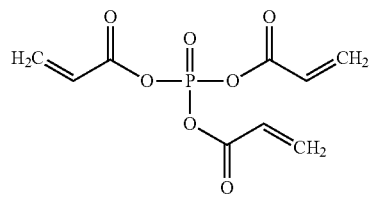

EXAMPLE 3

A rechargeable lithium battery cell was fabricated according to the same method as Example 1 except for using a non-aqueous organic solvent prepared by mixing ethylene carbonate (EC), propylene carbonate (PC), and ethylpropionate (EP) in a volume ratio of 3:1:6 instead of the non-aqueous organic solvent used in Example 1.

EXAMPLE 4

A rechargeable lithium battery cell was fabricated according to the same method as Example 2 except for using a non-aqueous organic solvent prepared by mixing ethylene carbonate (EC), propylene carbonate (PC), and ethylpropionate (EP) in a volume ratio of 3:1:6 instead of the non-aqueous organic solvent used in Example 2.

COMPARATIVE EXAMPLE 1

A rechargeable lithium battery cell was fabricated according to the same method as Example 1 except for using an additive prepared by mixing polyester polyol-based monomer represented by the above Chemical Formula 12 and hexyl acrylate in a weight ratio of 75:25 instead of the additive used in Example 1.

COMPARATIVE EXAMPLE 2

A rechargeable lithium battery cell was fabricated according to the same method as Example 1 except for using an additive prepared by mixing a polyester polyol-based monomer prepared by the above Chemical Formula 12 and triallyl phosphate in a weight ratio of 75:25 instead of the additive used in Example 1.

COMPARATIVE EXAMPLE 3

A rechargeable lithium battery cell was fabricated according to the same method as Example 1 except for using an additive prepared by mixing hexyl acrylate and triallyl phosphate in a weight ratio of 75:25 instead of the additive used in Example 1.

COMPARATIVE EXAMPLE 4

A rechargeable lithium battery cell was fabricated according to the same method as Example 1 except for using a polyester polyol-based monomer represented by the above Chemical Formula 12 instead of the additive used in Example 1.

COMPARATIVE EXAMPLE 5

A rechargeable lithium battery cell was fabricated according to the same method as Example 1 except for using hexyl acrylate instead of the additive used in Example 1.

COMPARATIVE EXAMPLE 6

A rechargeable lithium battery cell was fabricated according to the same method as Example 1 except for using triallyl phosphate instead of the additive used in Example 1.

Evaluation 1: Capacity Evaluation of Rechargeable lithium battery cell

Each rechargeable lithium battery cell according to Examples 1 to 4 and Comparative Examples 1 to 6 were charged and discharged under the following conditions 1) to 3) and measured regarding discharge capacity. The discharge capacity under the condition 3) was provided in the following Table 1.

1) charged at 0.2C under a cut-off condition of 4.2V/20 mA and discharged at 0.2C down to 2.75V 2) charged at 0.5C under a cut-off condition of 4.2V/20 mA and discharged at 0.2C down to 2.75V 3) charged at 1C under a cut-off condition of 4.2V/50 mA and discharged at 0.2C down to 3.0V Evaluation 2: Cycle-life characteristic of Rechargeable lithium battery cell at Room temperature Each rechargeable lithium battery cell according to Examples 1 to 4 and Comparative Examples 1 to 6 was repetitively charged 300 times at room temperature 25° C. at 1C under a cut-off condition of 4.2V/50 mA and discharged at 1C down to 3V and then, measured regarding cycle-life efficiency. The result is provided in the following Table 1.

The cycle-life efficiency (%) of the rechargeable lithium battery cells was calculated as a percentage obtained by dividing 300th discharge capacity by 1C capacity of 940 mAh/g.

Evaluation 3: High temperature cycle-life characteristic of Rechargeable lithium battery cell Each rechargeable lithium battery cell according to Examples 1 to 4 and Comparative Examples 1 to 6 was repetitively charged 300 times at 60° C. at 10 under a cut-off condition of 4.2V/50 mA and discharged at 1C down to 3V and measured regarding cycle-life efficiency. The result is provided in the following Table 1.

The cycle-life efficiency (%) of the rechargeable lithium battery cells was calculated as a percentage obtained by dividing 300th discharge capacity by 10 capacity of 940 mAh/g.

Evaluation 4: Thickness of Rechargeable lithium battery cell after allowed to stand Each rechargeable lithium battery cell according to Examples 1 to 4 and Comparative Examples 1 to 6 was charged and discharged under the following conditions 1) to 4), allowed to stand at room temperature for one hour, and then, measured for thickness and OCV and allowed to stand for an acceleration test in a 60° C. oven. The rechargeable lithium battery cells were measured regarding thickness and OCV every 5 days after being allowed to stand and also, measured regarding a thickness increase rate (%) after being allowed to stand for 15 days and 30 days. The results are provided in the following Table 1. The thickness was measured at 60° C. in an in situ situation using vernier callipers, and the OCV was measured using a Hioki meter after cooling down the rechargeable lithium battery cells at room temperature for 30 minutes.

1) charged at 0.2C under a cut-off condition of 4.2V/20 mA and discharged at 0.2C down to 2.75V 2) charged at 0.5C under a cut-off condition of 4.2V/20 mA and discharged at 0.2C down to 2.75V 3) charged at 0.5C under a cut-off condition of 4.2V/0.1C and discharged at 0.5C down to 3.2V 4) charged at 0.5C under a cut-off condition of a 4.2V/0.1C and discharged at 0.5C down to 3.0V Evaluation 5: High rate discharge efficiency of Rechargeable lithium battery cell Each rechargeable lithium battery cell according to Examples 1 to 4 and Comparative Examples 1 to 6 was charged and discharged under the following conditions 1) to 5) and measured regarding discharge capacity as battery capacity. In addition, discharge efficiency was measured and provided in the following Table 1.

1) charged at 0.5C under a cut-off condition of 4.2V/50 mA and discharged at 0.2C down to 3.0V 2) charged at 0.5C under a cut-off condition of 4.2V/50 mA and discharged at 0.5C down to 3.0V 3) charged at 0.5C under a cut-off condition of 4.2V/50 mA and discharged at 1C down to 3.0V 4) charged at 0.5C under a cut-off condition of 4.2V/50 mA and discharged at 2C down to 3.0V 5) charged at 0.5C under a cut-off condition of 4.2V/50 mA and discharged at 3C down to 3.0V In addition, the discharge efficiency (%) of the rechargeable lithium battery cells was calculated as a percentage obtained by dividing each capacity in the conditions 1) to 5) by discharge capacity at 0.2C.

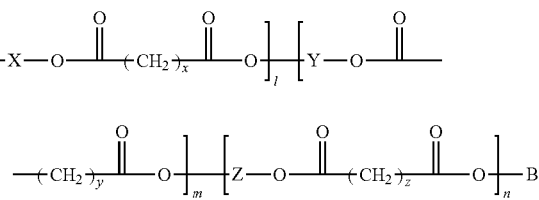

[Chemical Formula 1]

TABLE 1

| | Discharge capacity (mAh/g) | Cycle-life efficiency (%) at room temperature 25° C. | Cycle-life efficiency (%) at high temperature 60° C. | Thickness increase rate(%) after being allowed to stand at high temperature 60° C. | | Discharge efficiency (%) |
| --- | --- | --- | --- | --- | --- | --- |
| | | | | For 15 days | For 30 day | |
| Example 1 | 979 | 90 | 93 | 4 | 8 | 90 |
| Example 2 | 975 | 92 | 92 | 7 | 10 | 86 |
| Example 3 | 971 | 88 | 86 | 5 | 9 | 89 |
| Example 4 | 980 | 89 | 85 | 8 | 15 | 83 |
| Comparative Example 1 | 966 | 85 | 80 | 12 | 23 | 75 |
| Comparative Example 2 | 945 | 75 | 70 | 10 | 20 | 70 |
| Comparative Example 3 | 930 | 50 | 45 | 14 | 29 | 50 |
| Comparative Example 4 | 910 | 55 | 50 | 15 | 31 | 48 |
| Comparative Example 5 | 921 | 47 | 40 | 20 | 38 | 37 |
| Comparative Example 6 | 957 | 51 | 45 | 16 | 30 | 49 |

Referring to Table 1, the rechargeable lithium battery cells including the additive according to Example 1 to 4 had excellent cycle-life characteristics at room temperature and a high temperature compared with the ones according to Comparative Examples 1 to 6. In addition, the rechargeable lithium battery cells according to Examples 1 to 4 had excellent high temperature stabilities compared with the ones according to Comparative Examples 1 to 6. Furthermore, the rechargeable lithium battery cells including the additive according to Example 1 to 4 had excellent high rate cycle-life characteristics compared with the ones according to Comparative Examples 1 to 6.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An electrolyte for a rechargeable lithium battery, comprising a lithium salt, a non-aqueous solvent, and an additive, wherein the additive comprises:
   a polyester polyol-based monomer represented by the following Chemical Formula 1;
   C1 to C10 alkyl acrylate; and
   a phosphate-based compound selected from triallyl phosphate represented by the following Chemical Formula 10, triacryl phosphate represented by the following Chemical Formula 11, or a combination thereof:

wherein,

A and B are each independently one of substituents represented by the following Chemical Formulae 2 to 9, X, Y, and Z are each independently a residual group derived from an alcohol derivative, x, y, and z are each independently an integer of 1 to 20, and l, m, and n are each independently an integer of 1 to 35,

   [Chemical Formula 2]

   [Chemical Formula 3]

   [Chemical Formula 3]

   [Chemical Formula 5]

   [Chemical Formula 6]

   [Chemical Formula 7]

   [Chemical Formula 8]

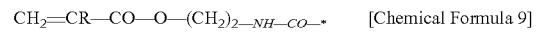   [Chemical Formula 9]

wherein, R is independently hydrogen, a C1 to C20 alkyl group, a C2 to C20 alkenyl group, a C2 to C20 alkynyl group, a C3 to C20 cycloalkyl group, a C3 to C20 cycloalkenyl group, a C3 to C20 cycloalkynyl group, or a C6 to C20 aryl group.

[Chemical Formula 10]

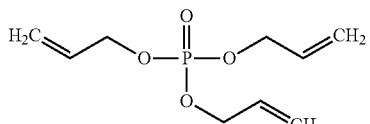

[Chemical Formula 11]

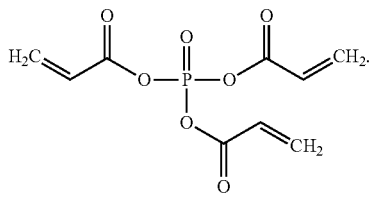

2. The electrolyte of claim 1, wherein the alcohol derivative in Chemical Formula 1 comprises ethyleneglycol, polyethyleneglycol, propyleneglycol, polypropyleneglycol, diethyleneglycol, alkanediol, ethoxylated alkanediol(ethoxylated alkanediol), propoxylated alkanediol(propoxylated alkanediol), trimethylolpropane, ethoxylated trimethylolpropane, propoxylated trimethylolpropane, ditrimethylolpropane, ethoxylated ditrimethylolpropane, propoxylated ditrimethylolpropane, pentaerythritol, ethoxylated pentaerythritol, propoxylated pentaerythritol, dipentaerythritol, ethoxylated dipentaerythritol, propoxylated dipentaerythritol, bisphenol A, ethoxylated bisphenol A, or propoxylated bisphenol A.

3. The electrolyte of claim 1, wherein the polyester polyol-based monomer has a weight average molecular weight of about 16,000 to about 20,000.

4. The electrolyte of claim 1, wherein the polyester polyol-based monomer has a number average molecular weight of about 6,000 to about 8,000.

5. The electrolyte of claim 1, wherein the alkyl acrylate comprises C4 to C8 alkyl acrylate.

6. The electrolyte of claim 1, wherein the additive comprises
  about 20 wt% to about 80 wt% of the polyester polyol-based monomer;
  about 10 wt% to about 60 wt% of the alkyl acrylate; and
  about 1 wt% to about 40 wt% of the phosphate-based compound.

7. The electrolyte of claim 1, wherein the additive comprises the polyester polyol-based monomer, the alkyl acrylate, and the phosphate-based compound in a weight ratio of about 75:15:10 to about 60:20:20.

8. The electrolyte of claim 1, wherein the additive is included in an amount of about 1 part to about 10 parts by weight based on 100 parts by weight of the non-aqueous solvent.

9. The electrolyte of claim 1, wherein the additive comprises triallyl phosphate represented by Chemical Formula 10.

10. A rechargeable lithium battery, comprising
  a positive electrode;
  a negative electrode; and
  an electrolyte comprising a lithium salt, a non-aqueous solvent, and an additive, wherein the additive comprises:
  a polyester polyol-based monomer represented by the following Chemical Formula 1;
  C1 to C10 alkyl acrylate; and
  a phosphate-based compound selected from triallyl phosphate represented by the following Chemical Formula 10, triacryl phosphate represented by the following Chemical Formula 11, or a combination thereof:

[Chemical Formula 1]

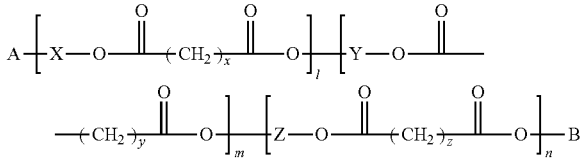

wherein,
A and B are each independently one of substituents represented by the following Chemical Formulae 2 to 9,
X, Y, and Z are each independently a residual group derived from an alcohol derivative,
x, y, and z are each independently an integer of 1 to 20, and
l, m, and n are each independently an integer of 1 to 35, $$CH_2=CR-CO-*$$ [Chemical Formula 2]

$$CH_2=CR-O-CH_2-*$$ [Chemical Formula 3]

$$CH_2=CR-*$$ [Chemical Formula 4]

$$CH_2=CR-O-CO-*$$ [Chemical Formula 5]

$$CH_2=CR-CH_2-O-*$$ [Chemical Formula 6]

$$CH_2=CH-SO_2-*$$ [Chemical Formula 7]

$$CH_2=CR-CH=CR-CH_2-*$$ [Chemical Formula 8]

$$CH_2=CR-CO-O-(CH_2)_2-NH-CO-*$$ [Chemical Formula 9]

wherein, R is independently hydrogen, a C1 to C20 alkyl group, a C2 to C20 alkenyl group, a C2 to C20 alkynyl group, a C3 to C20 cycloalkyl group, a C3 to C20 cycloalkenyl group, a C3 to C20 cycloalkynyl group, or a C6 to C20 aryl group.

[Chemical Formula 10]

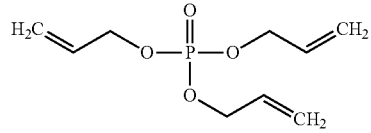

[Chemical Formula 11]

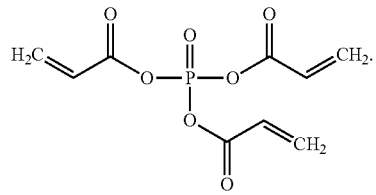

11. The rechargeable lithium battery of claim 10, wherein the alcohol derivative in Chemical Formula 1 comprises ethyleneglycol, polyethyleneglycol, propyleneglycol, polypropyleneglycol, diethyleneglycol, alkanediol, ethoxylated alkanediol(ethoxylated alkanediol), propoxylated alkanediol (propoxylated alkanediol), trimethylolpropane, ethoxylated trimethylolpropane, propoxylated trimethylolpropane, ditrimethylolpropane, ethoxylated ditrimethylolpropane, propoxylated ditrimethylolpropane, pentaerythritol, ethoxylated pentaerythritol, propoxylated pentaerythritol, dipentaerythritol, ethoxylated dipentaerythritol, propoxylated dipentaerythritol, bisphenol A, ethoxylated bisphenol A, or propoxylated bisphenol A.

12. The rechargeable lithium battery of claim 10, wherein the polyester polyol-based monomer has a weight average molecular weight of about 16,000 to about 20,000.

13. The rechargeable lithium battery of claim 10, wherein the polyester polyol-based monomer has a number average molecular weight of about 6,000 to about 8,000.

14. The rechargeable lithium battery of claim 10, wherein the alkyl acrylate comprises C4 to C8 alkyl acrylate.

15. The rechargeable lithium battery of claim 10, wherein the additive comprises
   about 20 wt% to about 80 wt% of the polyester polyol-based monomer;
   about 10 wt% to about 60 wt% of the alkyl acrylate; and
   about 1 wt% to about 40 wt% of the phosphate-based compound.

16. The rechargeable lithium battery of claim 10, wherein the additive comprises the polyester polyol-based monomer, the alkyl acrylate, and the phosphate-based compound in a weight ratio of about 75:15:10 to about 60:20:20.

17. The rechargeable lithium battery of claim 10, wherein the additive is included in an amount of about 1 part to about 10 parts by weight based on 100 parts by weight of the non-aqueous solvent.

18. The rechargeable lithium battery of claim 10, wherein the phosphate-based compound is triallyl phosphate represented by Chemical Formula 10.

* * * * *